United States Patent Office 3,453,829
Patented July 8, 1969

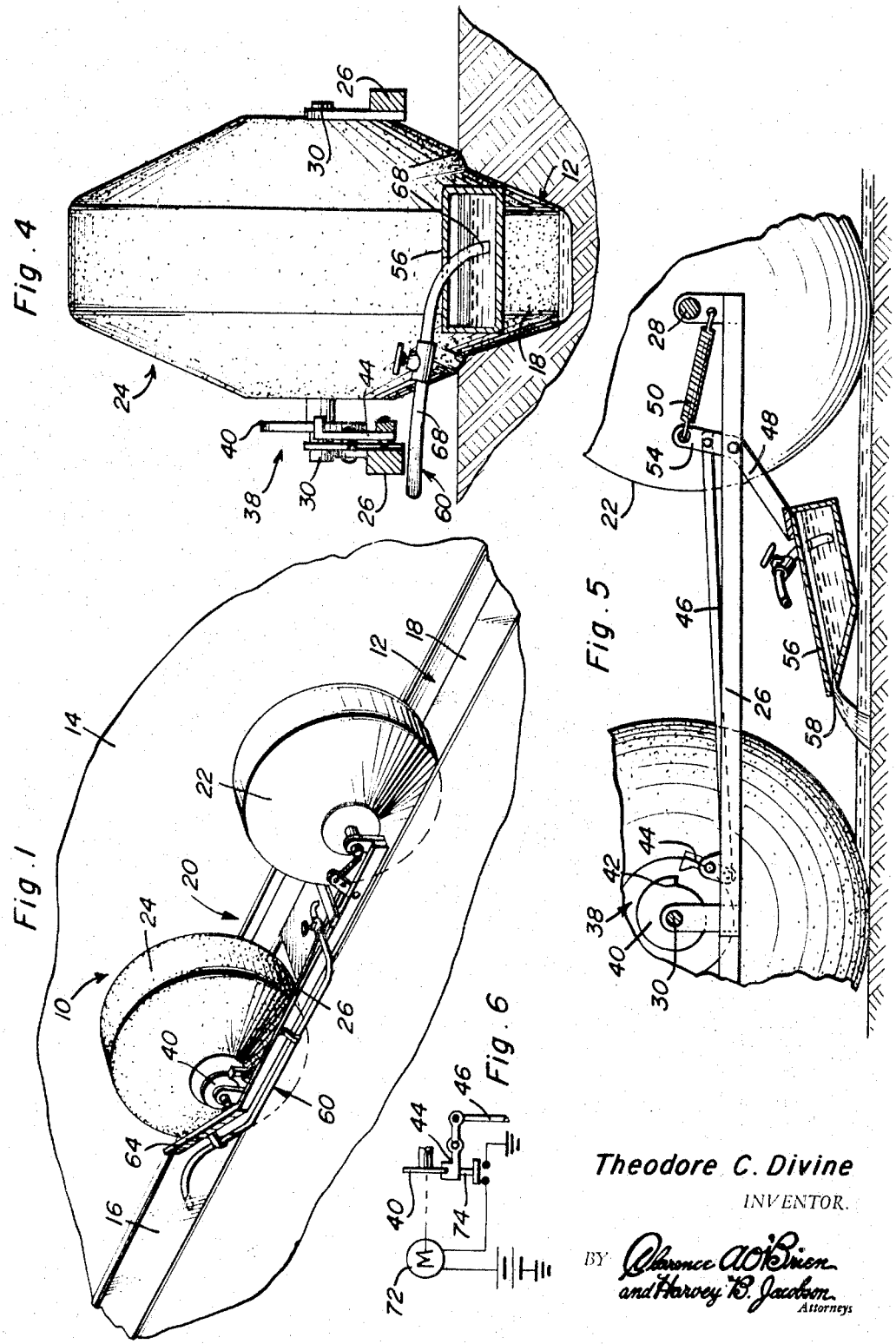

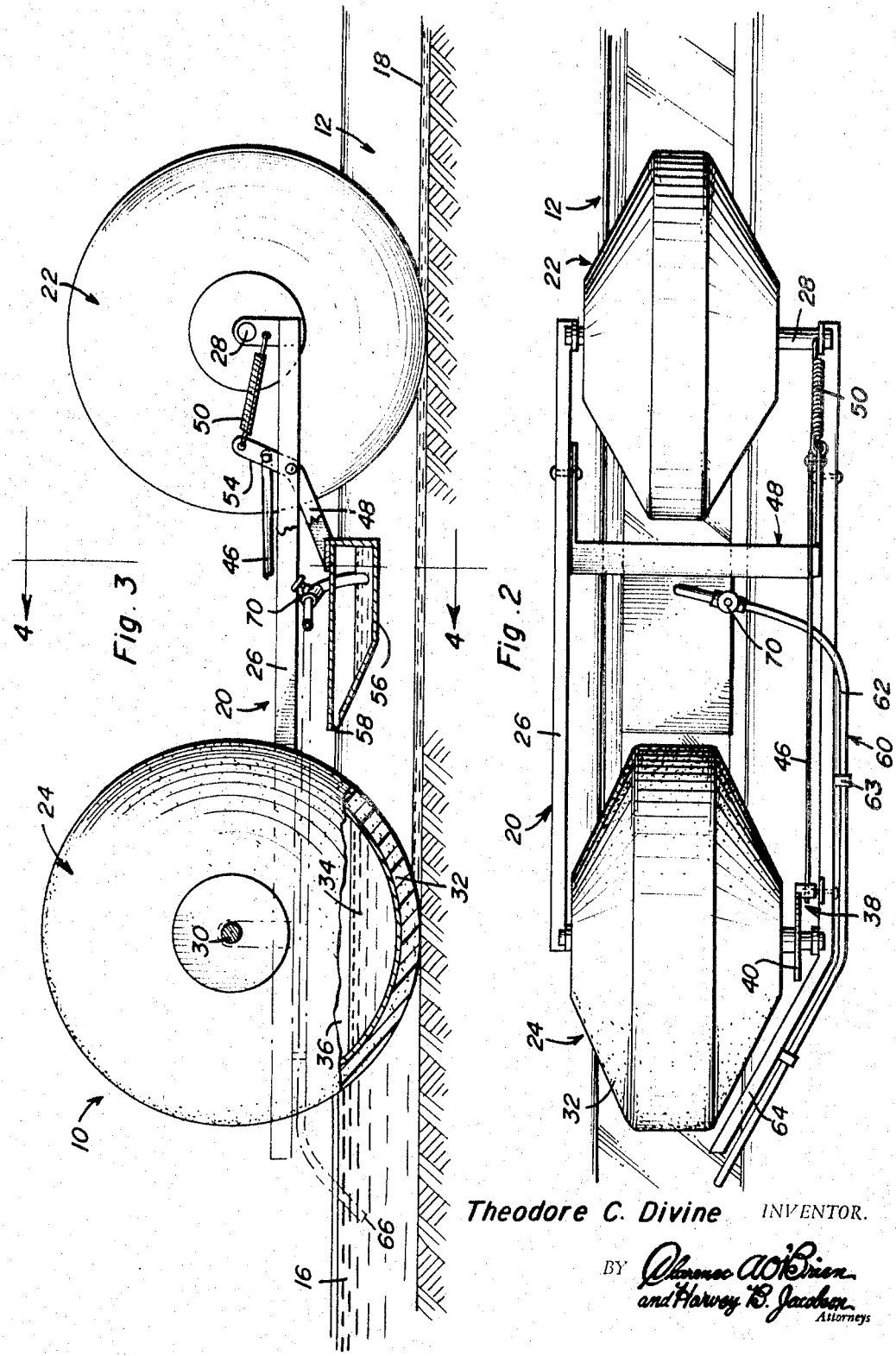

3,453,829
IRRIGATION MACHINE
Theodore C. Divine, Box 133, Bellevue, Idaho 83313
Filed Sept. 14, 1967, Ser. No. 667,813
Int. Cl. E02b 7/20, 13/00
U.S. Cl. 61—29     12 Claims

ABSTRACT OF THE DISCLOSURE

A travelling dam for irrigating a field by the ditch and flood method. The dam is formed by a large foam rubberlike covered traction wheel supporting a mobile frame for intermittent movement downstream through a ditch. Movement is automatically controlled at timed intervals by a flow regulated siphoning device filling a container movably mounted by the frame. When full, the container moves to an unloading position to empty its contents and momentarily releases a brake holding the traction wheel stationary so that the frame and the dam may move downstream within the ditch for a predetermined distance and stop.

---

This invention relates to the irrigation of crop growing fields by water conducted through open ditches and more particularly to a movable dam device positioned within the water supply ditch for controlling the distribution of water to irrigate the field.

The apparatus of the present invention is particularly designed although not necessarily limited to the ditch and flood method of irrigating fields wherein water is led into an open ditch dammed for predetermined periods at different locations so that the water may overflow the ditch and flood the area adjacent to the dam locations. By movement of the dam device downstream along the ditch, successive areas of the field may be flooded on either side of the ditch.

It is common practice to utilize flexible sheet dams which are manually moved from one location to another along spaced ditches. These flexible dams are usually moved every fifteen minutes and accordingly require the full attention of personnel in order to properly irrigate a field. Power operated machines have been proposed for movement of such flexible dams along a ditch. However, such machines are relatively heavy and therefore unsuitable for operation in regions characterized by soft soil. Furthermore, the power operated machines heretofore proposed were relatively expensive and required the attention of personnel to either operate or supervise operation.

In accordance with the present invention, a ditch damming machine is provided which intermittently moves downstream through an irrigation ditch in an automatic fashion and without requiring the supervision of any persons. The machine of the present invention also overcomes the problem of soft soil by featuring traction wheels that ride within the ditch itself, one of the wheels being covered with a suitable material so as to form the dam.

The present invention furthermore features a relatively simple timing mechanism for releasing a brake device through which the machine is held stationary at different dam locations for predetermined periods. The machine may also be automatically propelled from one location to another by a predetermined distance under the buoyant forces of the water within the ditch itself. Thus, one of the traction wheels may enclose a buoyancy chamber acted upon by the water upstream and downstream thereof so that the water level differential will apply torque in one direction to the wheel. The same water level differential is also utilized to operate the timing mechanism which is in the form of a siphoning device having a flow controlling valve therein. Thus, the siphoning device fills a container at a regulated rate so that when the container is full, it will gravitationally release the brake device to permit movement of the machine to the next location.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view showing the irrigation machine of the present invention in operation.

FIGURE 2 is a top plan view of the irrigation machine shown in FIGURE 1.

FIGURE 3 is a side elevational view of the machine with parts broken away and shown in section.

FIGURE 4 is a transverse sectional view taken substantially through a plane indicated by section line 4—4 in FIGURE 3.

FIGURE 5 is a partial side sectional view through the machine showing it in a released condition.

FIGURE 6 is a schematic view illustrating an alternative modified feature of the machine.

Referring now to the drawings in detail, FIGURE 1 illustrates the irrigation machine of the present invention generally referred to by reference numeral 10 shown disposed within an irrigation ditch 12. It will be appreciated, that a plurality of such ditches extend in substantially parallel spaced relation to each other through a crop growing field 14 to be irrigated and that one or more machines may be disposed within the ditches in order to control flooding of water on either side of the ditch adjacent to a dam location at which the machine stops. Thus, as shown in FIGURE 1, the machine 10 is held stationary so that it may dam water which rises to a higher level 16 on the upstream side of the machine as compared to the lower level 18 of the water on the downstream side. The water on the upstream side of the machine may accordingly rise to flood level in order to irrigate the area on either side of the ditch adjacent to the machine for a predetermined period after which the machine automatically moves downstream along the ditch to a new location where flooding occurs once again.

As more clearly seen in FIGURES 2 and 3, the machine includes a mobile frame generally referred to by reference numeral 20 supported above the level of the water within the ditch by a pair of relatively large wheels 22 and 24. The frame 20 may be formed by a pair of parallel spaced frame members 26 interconnected at the forward ends by the axle 28 on which the forward wheel 22 is rotatably mounted. The frame members are similarly interconnected adjacent the rear ends by the axle 30 on which the rear wheel 24 is rotatably mounted in longitudinal alignment with the forward wheel 22. The wheels are both disposed within the ditch and are dimensioned and shaped so as to engage the bottom and sides of the ditch for traction purposes. Furthermore, the rear wheel 24 is covered with a suitable layer of flexible material 32 made of a synthetic or natural rubber or of plastic foam. The flexible material 32 may also be covered by a thin rubberlike membrane. It will be apparent therefore, that the flexible layer 32 because it is backed by the particular shaped wheel and because of its property will effectively seal the ditch to form a dam thereby holding the water on the upstream side of the machine at a higher level 16 than the water on the downstream side.

By virtue of the water level differential on opposite sides of the wheel 24, a resultant buoyant force will be exerted on the wheel establishing a constant propelling torque as long as the wheel is held submerged within the water. The load of the frame 20 on the rear wheel 24 together with a body of ballast liquid 34 disposed within a buoyant chamber 36 enclosed within the wheel 24, holds the wheel 24 submerged within the water and in engagement with the bottom of the ditch for sealing purposes as shown in FIGURE 3. It will be apparent therefore, that a delicate balance exists between the load on the rear wheel necessary to maintain sealing and to obtain a net buoyant force sufficient to exert a propelling torque on the wheel. The quantity of ballast water 34 is selected accordingly.

The machine is held stationary for predetermined periods by means of a releasable brake mechanism 38 in order to regulate movement at the proper low rate. As more clearly seen in FIGURES 2, 4 and 5, the brake mechanism includes a one-way ratchet brake disc 40 secured to the traction wheel 24. The brake disc is provided with an engaging face 42 at one location on its periphery engaged by the end of a brake pawl 44 pivotally mounted on the frame member 26 adjacent to the brake disc. The brake pawl 44 is pin connected to a brake release rod 46 forming part of a control linkage which also includes a lever member 48 pivotally mounted by the frame member 26 in spaced adjacency to the axle 28 of the front wheel 22. A spring 50 is connected at its opposite ends to the frame and the upper arm portion 54 of the lever member to which the rod 46 is connected. Accordingly, the spring 50 is operative through the linkage to yieldably hold the brake pawl 44 in engagement with the brake disc 40 to prevent rotation of the wheel 24 and movement of the machine.

Mounted on the lower end of the lever member 48 between the wheels 22 and 24 is a container or tank 56 having a rearwardly extending discharge spout 58 as shown in FIGURES 3 and 5. Thus, with the brake mechanism held in an engaged position by the spring 50 as shown in FIGURE 3, the tank 56 will be in a substantially horizontal loading position so that it may be filled with water increasing the weight thereof. When the tank is substantially filled with water, its weight increases to a point overcoming the force of the spring 50 so as to downwardly pivot the lever member 48 to the unloading position shown in FIGURE 5. The water within the tank is thereby emptied into the ditch as shown. At the same time, angular displacement of the lever member 48 to the unloading position of the container, disengages the pawl 44 from the brake disc so as to release the traction wheel 24 causing movement thereof under the propelling torque aforementioned. As soon as the water within the tank 56 is emptied, the spring 50 returns the linkage and the tank to its loading position shown in FIGURE 3 and at the same time returns the brake pawl 44 to its brake engaging position. However, the traction wheel 24 continues to rotate until it completes 360° rotation in a clockwise direction as viewed in FIGURES 3 and 5 before the surface 42 on the periphery of the brake disc 40 is engaged by the pawl 44 in its brake engaging position. Thus, momentary release of the brake mechanism releases the machine for movement by a predetermined distance.

The machine is held stationary for a period time by means of a siphoning device 60 through which the tank 56 is filled with water from the upstream side of the machine. The siphoning device includes a siphon tube 62 secured by a plurality of clamps 63 to the frame. The siphoning tube extends rearwardly along the frame extension 64 to an inlet end 66 disposed below the water level 16. The outlet end 68 of the siphon tube is disposed within the tank 56 as shown in FIGURES 3 and 4. Thus, when the upstream water reaches flood level, water begins to fill the tank 56. In order to regulate the time it takes to fill the tank, a flow restricting valve 70 is disposed in the siphon tube 62 by means of which the flow rate may be varied to select the desired tank filling time. It will be apparent therefore, that the timing interval associated with the siphoning device 60 will only be initiated when water is at the proper level within the ditch on the upstream side of the machine and that the period regulated by the setting of the valve 70 is terminated by release of the brake mechanism 38 so that the machine may move to a new location.

As an alternative method of propelling the machine or as an auxiliary method, torque may be applied to the traction wheel 24 by means of a fractional horsepower motor 72 as schematically shown in FIGURE 6. Thus, an energizing circuit for the motor 72 may be completed by closing of a switch 74 when the brake pawl 44 is displaced to its released position. The machine is otherwise operative in the same manner.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A travelling dam adapted to move along an irrigation ditch including a mobile frame, a single pair of rotatable wheels disposed in tandem within the ditch longitudinally thereof supporting the frame above water within the ditch, flexible means mounted on one of said wheels sealingly conforming to the bottom portion of the ditch for blocking flow of said water through the ditch from an upstream side of the frame, and means mounted by the frame and engageable with one of said wheels for regulating rotation thereof and thereby controlling movement of the frame and the wheels downstream through the ditch.

2. The combination of claim 1 including a motor drivingly connected through said movement regulating means to said one of the wheels having the flexible means, the other of the wheels guiding movement of the frame downstream of said one of the wheels.

3. The combination of claim 2 wherein said one of the wheels encloses a chamber containing a body of liquid.

4. The combination of claim 1 wherein said one of the wheels encloses a chamber containing a body of liquid.

5. A travelling dam adapted to move along an irrigation ditch including a mobile frame, a pair of wheels disposed within the ditch supporting the frame above water within the ditch, sealing means mounted on one of said wheels for blocking flow of said water through the ditch from an upstream side of the frame, releasable brake means mounted by the frame and engageable with one of said wheels for preventing movement of the frame and the wheels downstream through the ditch, and time delay means mounted by the frame and connected to the brake means for release thereof in delayed response to a water level differential between upstream and downstream sides of the sealing means within the ditch, said time delay means comprising brake releasing linkage means connected to the brake means, spring means connected to the linkage means for yieldably holding brake means in an engaged condition, container means supported by the linkage means for movement between loading and unloading positions downstream of the sealing means within the ditch, siphoning means mounted by the frame for conducting water upstream of the sealing means into the container means causing movement thereof from the loading position to the unloading position against the bias of said spring means, and flow control means mounted by the siphoning means for regulating the rate at which water is conducted to the container means.

6. The combination of claim 5 wherein said sealing means comprises a flexible material covering said one of the wheels upstream of the container means.

7. The combination of claim 6 wherein one of the wheels encloses a buoyancy chamber containing a body of ballast liquid regulating the propelling torque applied to the wheel by the buoyant effect thereon of said water level differential.

8. A travelling dam adapted to move along an irrigation ditch including a mobile frame, a pair of wheels disposed within the ditch supporting the frame above water within the ditch, sealing means mounted on one of said wheels for blocking flow of said water through the ditch from an upstream side of the frame, releasable brake means mounted by the frame and engageable with one of said wheels for preventing movement of the frame and the wheels downstream through the ditch, and time delay means mounted by the frame and connected to the brake means for release thereof in delayed response to a water level differential between upstream and downstream sides of the sealing means within the ditch, said one of the wheels having the sealing means enclosing a buoyancy chamber containing a body of ballast liquid regulating the propelling torque applied to the wheel by the buoyant effect thereon of said water level differential.

9. The combination of claim 8 wherein said sealing means comprises a flexible material covering said one of the wheels.

10. A travelling dam adapted to move along an irrigation ditch including a mobile frame, a pair of wheels disposed within the ditch supporting the frame above water within the ditch, propelling means for applying torque to one of the wheels to move the frame in one direction downstream along the ditch, releasable brake means mounted by the frame and engageable with one of said wheels for preventing movement of the frame and the wheels downstream through the ditch, and time delay means mounted by the frame and connected to the brake means for release thereof in delayed response to a water level differential within the ditch, said time delay means comprising brake releasing linkage means connected to the brake means, spring means connected to the linkage means for yieldably holding the brake means in an engaged condition, container means supported by the linkage means for movement between loading and unloading positions, siphoning means mounted by the frame for conducting water upstream of the frame into the container means causing movement thereof from the loading position to the unloading position against the bias of said spring means, and flow control means mounted by the siphoning means for delaying said movement of the container means to the unloading position in which water is emptied into the ditch.

11. The combination of claim 10 wherein said brake means comprises, a one-way brake disc fixed to the wheel, a pawl engageable with the disc in one position thereof to prevent rotation of the wheel, said pawl being connected to the linkage means.

12. The combination of claim 11 wherein said propelling means comprises a buoyancy chamber enclosed within one of the wheels containing a body of ballast liquid regulating the propelling torque applied to the wheel by the buoyant effect thereon of said water level differential.

References Cited

UNITED STATES PATENTS

| | | | |
|---|---|---|---|
| 2,718,433 | 9/1955 | Poynor et al. | |
| 2,756,098 | 7/1956 | Rottcher. | |
| 2,880,937 | 4/1959 | King. | |
| 2,918,800 | 12/1959 | Ford | 61—12 |
| 3,303,655 | 2/1967 | Loomis | 61—12 |
| 3,153,330 | 10/1964 | Melin | 61—12 X |

EARL J. WITMER, *Primary Examiner.*

U.S. Cl. X.R.

61—12, 63